(12) United States Patent
Shibl et al.

(10) Patent No.: US 7,685,472 B1
(45) Date of Patent: Mar. 23, 2010

(54) METHOD AND APPARATUS FOR TESTING OBJECT-ORIENTED-PROGRAMMING METHODS

(75) Inventors: Bassem Shibl, San Diego, CA (US); Eric L. Deslauriers, Ramona, CA (US); Jason Fletchall, Madison, WI (US)

(73) Assignee: Intuit, Inc., Mountain View, CA (US)

( * ) Notice: Subject to any disclaimer, the term of this patent is extended or adjusted under 35 U.S.C. 154(b) by 509 days.

(21) Appl. No.: 11/700,706

(22) Filed: Jan. 30, 2007

(51) Int. Cl.
*G06F 11/00* (2006.01)
(52) U.S. Cl. .......................................... 714/38
(58) Field of Classification Search ............. 714/25–27, 714/31, 32, 37–39, 45–47
See application file for complete search history.

(56) References Cited

U.S. PATENT DOCUMENTS

| | | | |
|---|---|---|---|
| 6,353,897 B1 * | 3/2002 | Nock et al. | 714/38 |
| 7,237,231 B2 * | 6/2007 | Lambert | 717/127 |
| 2004/0003068 A1 * | 1/2004 | Boldman et al. | 709/223 |
| 2007/0168734 A1 * | 7/2007 | Vasile | 714/33 |
| 2008/0109681 A1 * | 5/2008 | De Pauw et al. | 714/38 |

* cited by examiner

Primary Examiner—Nadeem Iqbal
(74) Attorney, Agent, or Firm—Park, Vaughan & Fleming LLP

(57) ABSTRACT

One embodiment of the present invention provides a system that facilitates testing object-oriented programming (OOP) methods. During operation, the system receives a request from a client at a test-automation framework to execute a test case for the OOP methods. In response to the request, the system executes the test case in the test-automation framework. (Note that in this system, a class that includes the OOP methods inherits from an originally intended parent class, and calls to a test class are made via reflection.) The system then determines an outcome of executing the test case. Finally, the system reports the outcome of executing the test case.

27 Claims, 3 Drawing Sheets

METHOD AND APPARATUS FOR TESTING OBJECT-ORIENTED-PROGRAMMING METHODS

BACKGROUND

Related Art

In order to eliminate bugs and improve customer satisfaction, programmers often use specialized software to test their applications. However, testing software is typically difficult to use and imposes unwanted limitations on the programmer.

In most existing testing software, the process of executing a test method and the process of reporting the result of executing the test method are tightly coupled, such that: (1) a group of dynamically defined test cases will only produce a single test result regardless of the number of actual test cases contained in the group; and (2) when one of the test cases within the dynamically generated group fails, all other test cases in the group are skipped.

One problem with existing testing solutions is that aggregation and reuse of existing test methods is not supported. As a result, existing testing solutions are typically unable to report test method results, except when the test method is directly called by the test execution engine. Furthermore, existing testing solutions are typically unable to roll up a test method's results into a parent test method's result.

Another common problem results from the fact that existing testing software packages typically require the code being tested to inherit from a test class associated with the testing software. Because most programming languages support a "single-inheritance rule", inheriting from the test class can make it nearly impossible to detect problems resulting from inheritance from a runtime class.

SUMMARY

One embodiment of the present invention provides a system that facilitates testing object-oriented programming (OOP) methods. During operation, the system receives a request from a client at a test-automation framework to execute a test case for the OOP methods. In response to the request, the system executes the test case in the test-automation framework. (Note that in this system, a class that includes the OOP methods inherits from an originally intended parent class, and calls to a test class are made via reflection.) The system then determines an outcome of executing the test case. Finally, the system reports the outcome of executing the test case.

In another embodiment, the system receives a request from the client at the test-automation framework to execute a test suite, wherein the test suite comprises a plurality of test cases. In response to the request, the system executes the plurality of test cases in the test-automation framework. The system then determines a plurality of outcomes from executing the plurality of test cases. Finally, the system determines a combined outcome based on the plurality of outcomes, and reports the combined outcome.

In another embodiment, reporting the combined outcome involves reporting the plurality of outcomes.

In another embodiment, the system continues to execute test cases in the plurality of test cases after a test case in the plurality of test cases fails.

In another embodiment, the system stores outcomes in a persistent memory as the outcomes are determined to facilitate determining the cause of an abnormal termination.

In another embodiment, an outcome can include: a pass indicator, which indicates that the test case completed as expected; a delayed indicator, which indicates that the test case did not complete within a specified time period; a manual-verification indicator, which indicates that the outcome of the test case should be verified by a user; a fail indicator, which indicates that the test case did not complete as expected; and an incomplete indicator, which indicates that the test case failed to complete.

In another embodiment, the system receives a request from the client at the test-automation framework to execute a reference application, wherein the reference application includes a plurality of calls to a plurality of test cases. Note that the reference application allows a programmer to test a system in a way that simulates a user using the system. In response to the request, the system executes the reference application, wherein executing the reference application involves executing test cases from the plurality of test cases in the test-automation framework as they are called by the reference application. The system then determines a plurality of outcomes from executing test cases in the plurality of test cases. The system also determines a combined outcome based on the plurality of outcomes. Finally, the system reports the combined outcome.

In another embodiment, executing a test case involves calling a second test case from the test case. In response to calling the second test case, the system executes the second test case. The system then determines an outcome of executing the second test case. Finally, the system reports the outcome of the second test case.

In another embodiment, reporting the outcome of the second test case involves including the outcome of the second test case in the outcome of the test case.

In another embodiment, a test within the test case can include an OOP method that is included within the class, and is not included within a test class. Note that the test class includes calls to test methods which are included in the test automation framework.

In another embodiment, receiving the request from the client can involve receiving the request entered through an operating system command-line.

In another embodiment, the test case can accept parameters during testing.

In another embodiment, the system sends a test-case-execution-status for the test case to a user. The system then receives a flow command for the test case from the user, wherein the flow command instructs the test-automation framework when and how to execute the test case. In response to receiving the flow command, the system continues to execute the test case in accordance with the flow command. Note that in one embodiment of the present invention, the system supports Model-Driven Development (MDD), as well as other Model-Driven Engineering (MDE) paradigms.

In another embodiment, the test-automation framework includes a centralized repository, wherein the centralized repository includes verification logic for the test case.

DETAILED DESCRIPTION

Figure 1:
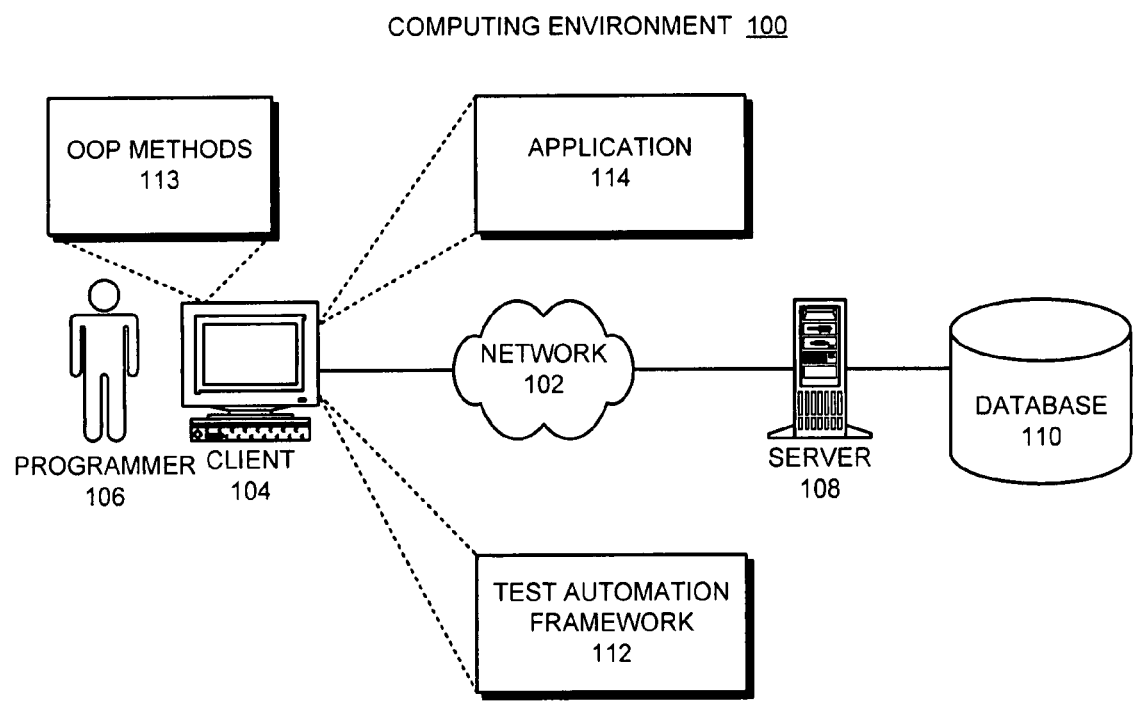
FIG. 1 illustrates a computing environment in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

OVERVIEW

One embodiment of the present invention provides a system that facilitates testing object-oriented programming (OOP) methods. During operation, the system receives a request from a client at a test-automation framework to execute a test case for the OOP methods. Note that the client can include a programmer, an application, or even another test executing within the test-automation framework.

In response to the request, the system executes the test case in the test-automation framework. Note that a class that includes the OOP methods is not required to inherit from a test class associated with the test-automation framework. This allows the programmer to test the OOP methods as they would execute during a typical execution, instead of limiting testing to a special testing environment. Furthermore, because the class is not required to inherit from a special test class, the test-automation framework can test that the inheritance is working properly. The system then determines an outcome of executing the test case. Finally, the system reports the outcome.

Note that calls to a test class or additional test logic may be facilitated via reflection. Reflection is the ability to specify which code to [deterministically] run at runtime rather than at compile time.

In another embodiment, the system receives a request from the client at the test-automation framework to execute a test suite, wherein the test suite comprises a plurality of test cases. In response to the request, the system executes the plurality of test cases in the test-automation framework. The system then determines a plurality of outcomes from executing the plurality of test cases. Finally, the system determines a combined outcome based on the plurality of outcomes, and reports the combined outcome.

In another embodiment, reporting the combined outcome involves reporting the plurality of outcomes. For example, it is often desirable for the programmer to not only see the combined outcome for the entire test suite, but also to see the outcomes of each individual test case within the test suite. For example, in the case where a certain test case is failing, it can be beneficial to see the outcomes of all of the tests to determine if the failure is linked to the failure of another test case within the test suite.

In another embodiment, the system continues to execute test cases in the plurality of test cases after a test case in the plurality of test cases fails. This is important for several reasons. First, upon completion of the test suite, the programmer is presented with a complete list of outcomes for all of the test cases within the test suite. Rather than having to keep executing the test suite and fixing each problem as it arises, the programmer can run the test suite to completion and then fix all of the discovered problems at once, thereby eliminating the need to spend extra time running the test suite. Existing solutions are problematic because the failing test cases need to be removed by hand, the code recompiled, and then the remaining tests run. In contrast, one embodiment of the present invention provides significant time and resource value by solving this problem in the manner described above.

Furthermore, continuing to execute the test cases after the failure of a test case allows for the testing of error cases, which is difficult or impossible with existing testing solutions. For example, consider the case where test a is expected to pass and the system is then expected to store some corresponding information into a database. However, if test a fails, the system is expected to not store some corresponding information into a database. In this example, the present invention allows to check that information was not stored into the database upon the failure of test a. Because most existing testing systems will halt the execution of a test suite upon any error, checking for this situation would be problematic.

In another embodiment, the system stores, in a persistent memory, outcomes in the plurality of outcomes as the outcomes are determined. Note that storing the outcomes facilitates determining the cause of an abnormal termination. For example, if the execution of a certain piece of code keeps causing the system to crash, by analyzing the outcomes it may be possible to determine that the system keeps crashing while a certain piece of code is being executed. With this embodiment, it is possible for the programmer to know the last successfully executed tests. This can help the programmer to identify the problematic code more quickly than without the assistance of the stored outcomes because the programmer knows the last successful test and can infer where things "started to go wrong".

In another embodiment, an outcome can include: a pass indicator, which indicates that the test case completed as expected; a delayed indicator, which indicates that the test developer has indicated that the test was not able to be completed without a required delay greater than the amount of time the test developer wanted the test duration to be; a manual-verification indicator, which indicates that the outcome of the test case should be verified by a user; a fail indicator, which indicates that the test case did not complete as expected; and an incomplete indicator, which indicates that the test case failed to complete (which can also indicate a problem with the test-automation framework or the test case itself).

In another embodiment, the system receives a request from the client at the test-automation framework to execute a reference application, wherein the reference application includes a plurality of calls to a plurality of test cases. Note that the reference application allows a programmer to test a system in a way that simulates a user using the system. In response to the request, the system executes the reference application, wherein executing the reference application involves executing test cases from the plurality of test cases in the test-automation framework as they are called by the reference application. For example, consider the situation where a programmer has created a number of mathematical functions, such as sin( ), sqrt( ), and tan( ). The programmer can create a test case for each mathematical function and can add the test cases to a calculator reference application. As the programmer interacts with the calculator reference application by invoking each of the functions, the test-automation framework executes the test cases associated with the functions. In this manner, the methods can be tested in an environment similar to the environment in which they will be released.

The system then determines a plurality of outcomes from executing test cases in the plurality of test cases. The system also determines a combined outcome based on the plurality of outcomes. Finally, the system reports the combined outcome.

In another embodiment, executing a test case involves calling a second test case from the test case. In response to calling the second test case, the system executes the second test case. The system then determines an outcome of executing the second test case. Finally, the system reports the outcome of the second test case.

In another embodiment, reporting the outcome of the second test case involves including the outcome of the second test case in the outcome of the test case. In this manner, child test case outcomes can be rolled up with the outcome of the parent test case, or can be reported individually.

In another embodiment, a test within the test case can include an OOP method that is included within the class, and is not included within a test class. Note that the test class includes testing methods and is provided by the test-automation framework. In this way, if the method being tested includes a test of its own, that test can be incorporated into the outcome of the test case. For example, if the code being tested is a check-digit verifier, not only can the outcome of the test case indicate weather or not the check-digit verifier code worked properly, it can also include the result of the check-digit verifier code itself. Thus, if the check-digit verifier code worked normally but the check-digit verifier code reported that the check-digit is incorrect, the outcome of the test case can include that the check-digit is incorrect.

In another embodiment, receiving the request from the client can involve receiving the request entered through an operating system command-line.

In another embodiment, the test case can accept parameters during testing. If the method being tested requires parameters to be passed to the method during execution, the test case needs to be aware of these parameters and can accept the parameters on behalf of the method being tested.

In another embodiment, the system sends a test case execution status for the test case to a user. The system then receives a flow command for the test case from the user. In response to receiving the flow command, the system continues to execute the test case in accordance with the flow command. Unlike many existing test systems where the flow of the test suite is controlled by the testing framework, the present invention allows for the testing framework or the programmer to control the flow of the test suite.

In another embodiment, the test-automation framework includes a centralized repository, wherein the centralized repository includes verification logic for the test case. Centralized storage of the test logic simplifies the reuse of test code and significantly improves maintainability while reducing maintenance costs. This embodiment facilitates the extension of the OOP paradigm to the test-automation framework itself, which is restricted or not possible with existing testing frameworks.

Computing Environment

FIG. 1 illustrates a computing environment 100 in accordance with an embodiment of the present invention. Computing environment 100 includes network 102, client 104, programmer 106, server 108, and database 100.

Network 102 can generally include any type of wired or wireless communication channel capable of coupling together computing nodes. This includes, but is not limited to, a local area network, a wide area network, or a combination of networks. In one embodiment of the present invention, network 102 includes the Internet.

Client 104 can generally include any node on a network including computational capability and including a mechanism for communicating across the network.

Server 108 can generally include any computational node including a mechanism for servicing requests from a client for computational and/or data storage resources. Note that in one embodiment of the present invention, Client 104 and Server 108 are compliant with the Server-Oriented Architecture (SOA) paradigm.

Database 110 can include any type of system for storing data. This includes, but is not limited to, systems based upon magnetic, optical, or magneto-optical storage devices, as well as storage devices based on flash memory and/or battery-backed up memory.

Client 104 includes test-automation framework 112, object-oriented programming (OOP) method 113, and reference application 114. Note that test-automation framework may also exist on server 108, or on a combination of both client 104 and server 108. Furthermore, test logic and results may optionally be stored within database 110.

Test-Automation Framework

Figure 2:
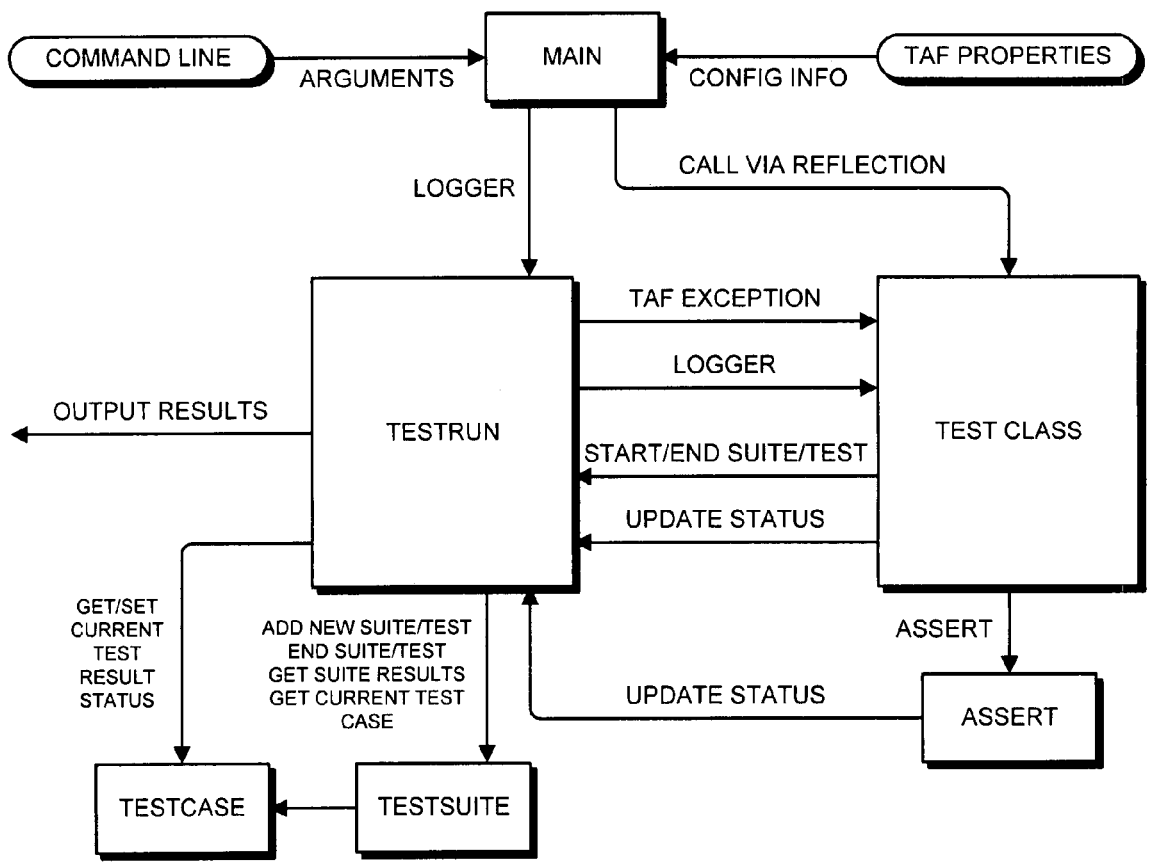
FIG. 2 illustrates a test-automation framework in accordance with an embodiment of the present invention.

FIG. 2 illustrates a test-automation framework 112 in accordance with an embodiment of the present invention. Furthermore, FIG. 2 illustrates a typical testing flow through test-automation framework 112.

Test Case

Figure 3:
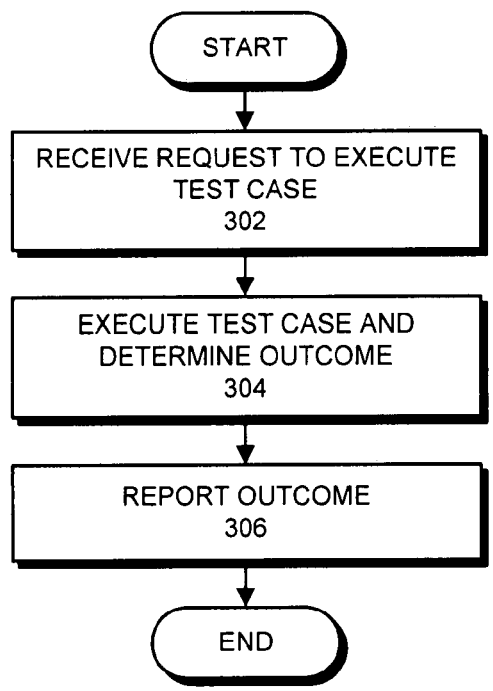
FIG. 3 presents a flow chart illustrating the process of executing a test case in accordance with an embodiment of the present invention.

FIG. 3 presents a flow chart illustrating the process of executing a test case in accordance with an embodiment of the present invention. The system operates by receiving a request to execute a test case (step 302). Note that the request can come from programmer 106, as well as from another test case. In addition, the request can come from the test-automation framework 112, or from a command-line interface on client 104.

Next, the system executes the test case and determines the outcome (step 304). Finally, the system reports the outcome (step 306). Note that reporting the outcome can involve presenting a report to programmer 106, storing the results to a persistent storage, such as in an eXtensible Markup Language (XML) file on client 104, or storing the outcome in database 110.

Also note that the outcome can include: a pass indicator, which indicates that the test case completed as expected; a delayed indicator, which indicates that the test case did not complete within a specified time period; a manual-verification indicator, which indicates that the outcome of the test case should be verified by a user (such as programmer 106); a fail indicator, which indicates that the test case did not complete as expected; and an incomplete indicator, which indicates that the test case failed to complete (which can also indicate a problem with the test-automation framework or the test case itself).

Test Suite

Figure 4:
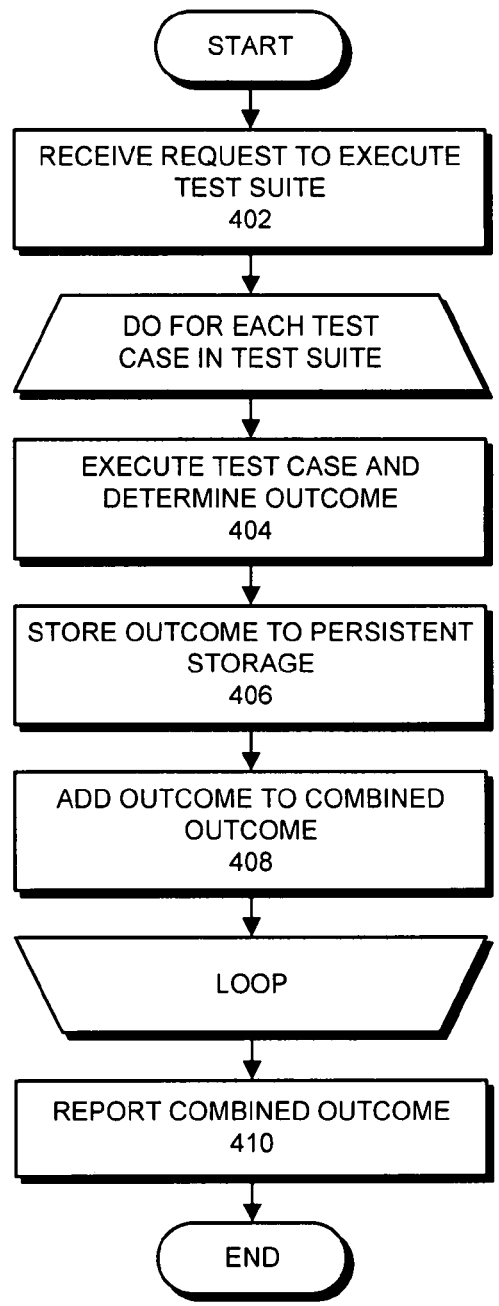
FIG. 4 presents a flow chart illustrating the process of executing a test suite in accordance with an embodiment of the present invention.

FIG. 4 presents a flow chart illustrating the process of executing a test suite in accordance with an embodiment of the present invention. The system operates by receiving a request to execute a test case (step 402). Next, for each test case in the test suite, the system: executes the test case and determines the outcome (step 404); stores the outcome to a persistent storage (step 406); and adds the outcome to a combined outcome (step 408). Note that storing the outcome to persistent storage facilitates in determining the cause of an abnormal termination of the system.

Finally, the system reports the combined outcome (step 410). Note that the system may optionally report the individual outcomes of each test case within the test suite.

In one embodiment of the present invention, executing the test suite involves executing a reference application, such as application 114. As application 114 calls the methods associated with the test cases, the test cases are subsequently executed and the outcomes are reported.

SUMMARY

One embodiment of the present invention provides a system that facilitates testing object-oriented programming (OOP) methods. During operation, the system receives a request from a client 104 at a test-automation framework 113 to execute a test case for the OOP methods 113. Note that the client 104 can include a programmer 106, an application 114, or even another test executing within the test-automation framework 112.

In response to the request, the system executes the test case in the test-automation framework 112. Note that a class that includes the OOP methods 113 is not required to inherit from a test class associated with the test-automation framework 112. This allows the programmer 106 to test the OOP methods 113 as they would execute during a typical execution, instead of limiting testing to a special testing environment. Furthermore, because the class is not required to inherit from a special test class, the test-automation framework 112 can test that the inheritance is working properly. The system then determines an outcome of executing the test case. Finally, the system reports the outcome.

One embodiment of the present invention does not require the class containing the methods being tested to inherit from a test class. Furthermore, one embodiment of the present invention allows for the reuse of test cases. Note that this significantly improves maintainability while reducing maintenance costs. This embodiment facilitates the extension of the OOP paradigm to the test-automation framework itself, which is restricted or not possible with existing testing frameworks.

In one embodiment of the present invention, a test case may invoke another test case, and the outcomes can be reported separately, or combined into one outcome. In one embodiment of the present invention, the test suite continues to execute even after a test case within the test suite has failed. This enables the programmer to test for specific "on-fail" cases as well as to provide for more-efficient testing of methods. (A list of multiple test case failures can be presented to programmer 106 at one time rather than programmer 106 having to discover and correct one failure at a time.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for testing object-oriented programming (OOP) methods, the method comprising:
    receiving a request from a client at a test-automation framework to execute a test case for the OOP methods;
    in response to the request, executing the test case in the test-automation framework, wherein a class that includes the OOP methods inherits from an originally intended parent class, and wherein calls to a test class are made via reflection, wherein a test within the test case can include an OOP method that is included within the class, and is not included within a test class, and wherein the test class includes calls to test methods provided by the test-automation framework;
    determining an outcome of executing the test case; and
    reporting the outcome.

2. The method of claim 1, further comprising:
    receiving a request from the client at the test-automation framework to execute a test suite, wherein the test suite comprises a plurality of test cases;
    in response to the request, executing the plurality of test cases in the test-automation framework;
    determining a plurality of outcomes from executing the plurality of test cases;
    determining a combined outcome based on the plurality of outcomes; and
    reporting the combined outcome.

3. The method of claim 2, wherein reporting the combined outcome involves reporting the plurality of outcomes.

4. The method of claim 2, further comprising continuing to execute test cases in the plurality of test cases after a test case in the plurality of test cases fails.

5. The method of claim 2, further comprising storing outcomes in the plurality of outcomes in a persistent memory as the outcomes are determined, wherein storing the outcomes facilitates determining the cause of an abnormal termination.

6. The method of claim 1, wherein an outcome can include:
    a pass indicator, which indicates that the test case completed as expected;
    a delayed indicator, which indicates that the test case did not complete within a specified time period;
    a manual-verification indicator, which indicates that the outcome of the test case should be verified by a user;
    a fail indicator, which indicates that the test case did not complete as expected; and
    an incomplete indicator, which indicates that the test case failed to complete.

7. The method of claim 1, further comprising:
    receiving a request from the client at the test-automation framework to execute a reference application, wherein the reference application includes a plurality of calls to a plurality of test cases;
    in response to the request, executing the reference application, wherein executing the reference application involves executing test cases from the plurality of test cases in the test-automation framework as they are called by the reference application;
    determining a plurality of outcomes from executing test cases in the plurality of test cases;
    determining a combined outcome based on the plurality of outcomes; and
    reporting the combined outcome.

8. The method of claim 1, wherein executing a test case involves:
   calling a second test case from the test case;
   in response to calling the second test case, executing the second test case;
   determining an outcome of executing the second test case; and
   reporting the outcome of the second test case.

9. The method of claim 8, wherein reporting the outcome of the second test case involves including the outcome of the second test case in the outcome of the test case.

10. The method of claim 1, wherein receiving the request from the client can involve receiving the request entered through an operating system command-line.

11. The method of claim 1, wherein the test case can accept parameters during testing.

12. The method of claim 1, further comprising:
   sending a test case execution status for the test case to a user;
   receiving a flow command for the test case from the user, wherein the flow command instructs the test-automation framework when and how to execute the test case; and
   in response to receiving the flow command, continuing to execute the test case in accordance with the flow command.

13. The method of claim 1, wherein the test-automation framework includes a centralized repository, wherein the centralized repository includes a verification logic of the test case.

14. A computer-readable storage medium storing instructions that when executed by a computer cause the computer to perform a method for testing object-oriented programming (OOP) methods, the method comprising:
   receiving a request from a client at a test-automation framework to execute a test case for the OOP methods;
   in response to the request, executing the test case in the test-automation framework, wherein a class that includes the OOP methods inherits from an originally intended parent class, and wherein calls to a test class are made via reflection, wherein a test within the test case can include an OOP method that is included within the class, and is not included within a test class, and wherein the test class includes calls to test methods provided by the test-automation framework;
   determining an outcome of executing the test case; and
   reporting the outcome.

15. The computer-readable storage medium of claim 14, wherein the method further comprises:
   receiving a request from the client at the test-automation framework to execute a test suite, wherein the test suite comprises a plurality of test cases;
   in response to the request, executing the plurality of test cases in the test-automation framework;
   determining a plurality of outcomes from executing the plurality of test cases;
   determining a combined outcome based on the plurality of outcomes; and
   reporting the combined outcome.

16. The computer-readable storage medium of claim 15, wherein reporting the combined outcome involves reporting the plurality of outcomes.

17. The computer-readable storage medium of claim 15, wherein the method further comprises continuing to execute test cases in the plurality of test cases after a test case in the plurality of test cases fails.

18. The computer-readable storage medium of claim 15, wherein the method further comprises storing outcomes in the plurality of outcomes in a persistent memory as the outcomes are determined, wherein storing the outcomes facilitates determining the cause of an abnormal termination.

19. The computer-readable storage medium of claim 14, wherein an outcome can include:
   a pass indicator, which indicates that the test case completed as expected;
   a delayed indicator, which indicates that the test case did not complete within a specified time period;
   a manual-verification indicator, which indicates that the outcome of the test case should be verified by a user;
   a fail indicator, which indicates that the test case did not complete as expected; and
   an incomplete indicator, which indicates that the test case failed to complete.

20. The computer-readable storage medium of claim 14, wherein the method further comprises:
   receiving a request from the client at the test-automation framework to execute a reference application, wherein the reference application includes a plurality of calls to a plurality of test cases;
   in response to the request, executing the reference application, wherein executing the reference application involves executing test cases from the plurality of test cases in the test-automation framework as they are called by the reference application;
   determining a plurality of outcomes from executing test cases in the plurality of test cases;
   determining a combined outcome based on the plurality of outcomes; and
   reporting the combined outcome.

21. The computer-readable storage medium of claim 14, wherein executing a test case involves:
   calling a second test case from the test case;
   in response to calling the second test case, executing the second test case;
   determining an outcome of executing the second test case; and
   reporting the outcome of the second test case.

22. The computer-readable storage medium of claim 21, wherein reporting the outcome of the second test case involves including the outcome of the second test case in the outcome of the test case.

23. The computer-readable storage medium of claim 14, wherein receiving the request from the client can involve receiving the request entered through an operating system command-line.

24. The computer-readable storage medium of claim 14, wherein the test case can accept parameters during testing.

25. The computer-readable storage medium of claim 14, wherein the method further comprises:
   sending a test case execution status for the test case to a user;
   receiving a flow command for the test case from the user, wherein the flow command instructs the test-automation framework when and how to execute the test case; and
   in response to receiving the flow command, continuing to execute the test case in accordance with the flow command.

26. The computer-readable storage medium of claim 14, wherein the test-automation framework includes a centralized repository, wherein the centralized repository includes a verification logic of the test case.

27. An apparatus configured for testing object-oriented programming (OOP) methods, comprising:
- a receiving mechanism configured to receive a request from a client at a test-automation framework to execute a test case for the OOP methods;
- an execution mechanism configured to execute the test case in the test-automation framework in response to the request, wherein a class that includes the OOP methods inherits from an originally intended parent class, and wherein calls to a test class are made via reflection, wherein a test within the test case can include an OOP method that is included within the class, and is not included within a test class, and wherein the test class includes calls to test methods provided by the test-automation framework;
- a determination mechanism configured to determine an outcome of executing the test case; and
- a reporting mechanism configured to report the outcome.

* * * * *